Figure 1:
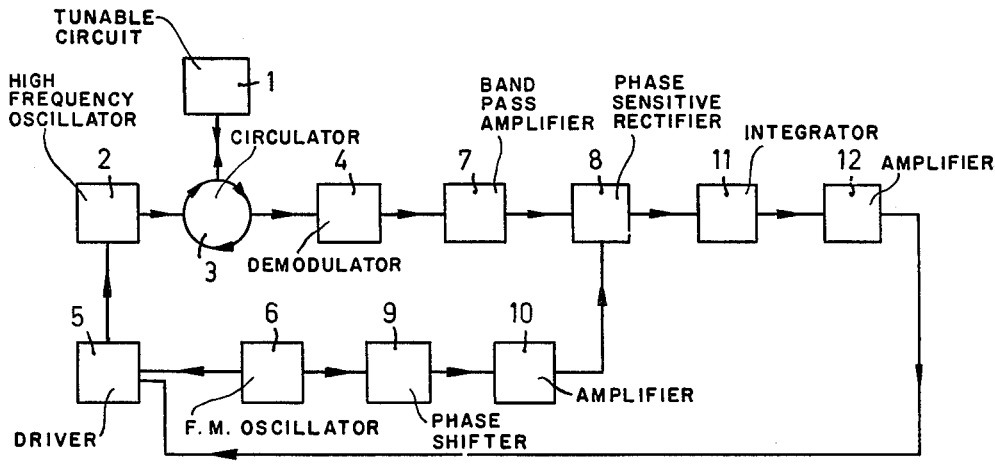

May 3, 1966    B. O. AS ETAL    3,249,937
DEVICE FOR REGULATING THE FREQUENCY OF AN OSCILLATOR
SUBSTANTIALLY IN COINCIDENCE WITH VARIATIONS IN
THE NATURAL FREQUENCY OF A RESONANCE CIRCUIT
Filed Aug. 6, 1963    3 Sheets-Sheet 1

INVENTORS
BENGT OLOF AS
BY NILS WESTERLID

AGENT

United States Patent Office 3,249,937
Patented May 3, 1966

3,249,937
DEVICE FOR REGULATING THE FREQUENCY OF AN OSCILLATOR SUBSTANTIALLY IN COINCIDENCE WITH VARIATIONS IN THE NATURAL FREQUENCY OF A RESONANCE CIRCUIT
Bengt Olof As, Nasby Park, and Nils Westerlid, Stockholm, Sweden, assignors to North American Philips Company, Inc., New York, N.Y., a corporation of Delaware
Filed Aug. 6, 1963, Ser. No. 300,375
8 Claims. (Cl. 343—14)

The present invention relates generally to a radar tranceiver device, and more particularly a device comprising a transmitting tube having a tuned circuit for determining the carrier frequency of the transmitted radar pulses, means for continuously varying the frequency of said tuned circuit, a modulator for producing a transmitting pulse by means of the transmitting tube, and means for exciting the modulator for causing radar pulses to be transmitted having a frequency depending upon the instant of excitation. The device further comprises a receiver having a mixing stage and a local oscillator to derive an intermediate frequency signal of a predetermined fixed frequency from the incoming echo signals, said local oscillator being provided with freqquency control means for varying the local oscillator frequency for providing the said constant intermediate frequency at different frequencies of the transmitted pulse.

It is known that in radar systems having a pulse transmitting tube with continuously variable frequency tuning, it is possible to achieve a predetermined intermediate frequency by changing a local oscillator frequency between different frequency levels and having the occurrences of coincidence between the local oscillator frequency and the natural frequency of the transmitting tube in non-excited condition to effect triggering of the modulator of the transmitting tube. Such a system, however, does not permit a choice of triggering instants, which is a serious drawback with regard to the impossibility of obtaining a favorable distribution of the transmitted pulses in time.

It is an object of the present invention to provide a system wherein coincidence triggering is a planned event.

According to the present invention frequency control means are included in a regulating circuit operated by a control current or voltage. This control current or voltage is derived from a frequency measuring device for measuring the natural frequency of the transmitting tube so as to substantially maintain a predetermined relationship, preferably equality, between the local oscillator frequency and the natural frequency of the tuned circuit in the non-excited condition of the transmitting tube, during intervals terminated by the excitation of said modulator. Means are provided for storing the momentary value of said control current or voltage and for interrupting the supply of control current or voltage at the moment of excitation so as to maintain, by said storing means, the local frequency prevailing at the instant of excitation during the echo time interval. Further means are provided for restoring the supply of control current or voltage at the termination of the echo time interval.

By "slaving" the local oscillator to the varying tuning frequency of the transmitting tube, information about the instantaneous tuning frequency of the transmitting tube is available at any moment before triggering the modulator. The said triggering can therefore take place at any desired moment in accordance with a predetermined program. The triggering may, for example, be effected by means of a pulse generator delivering trigger pulses at random, which generator is made effective during selected intervals.

Figure 2:
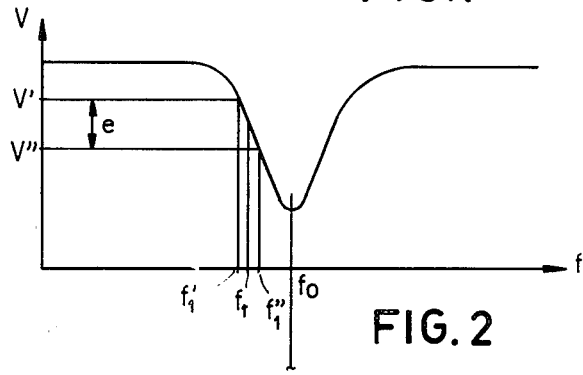
Figure 3:
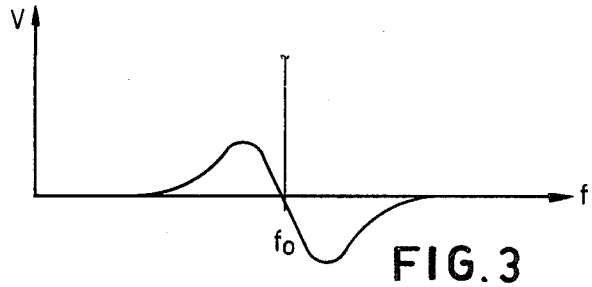
Figure 4:
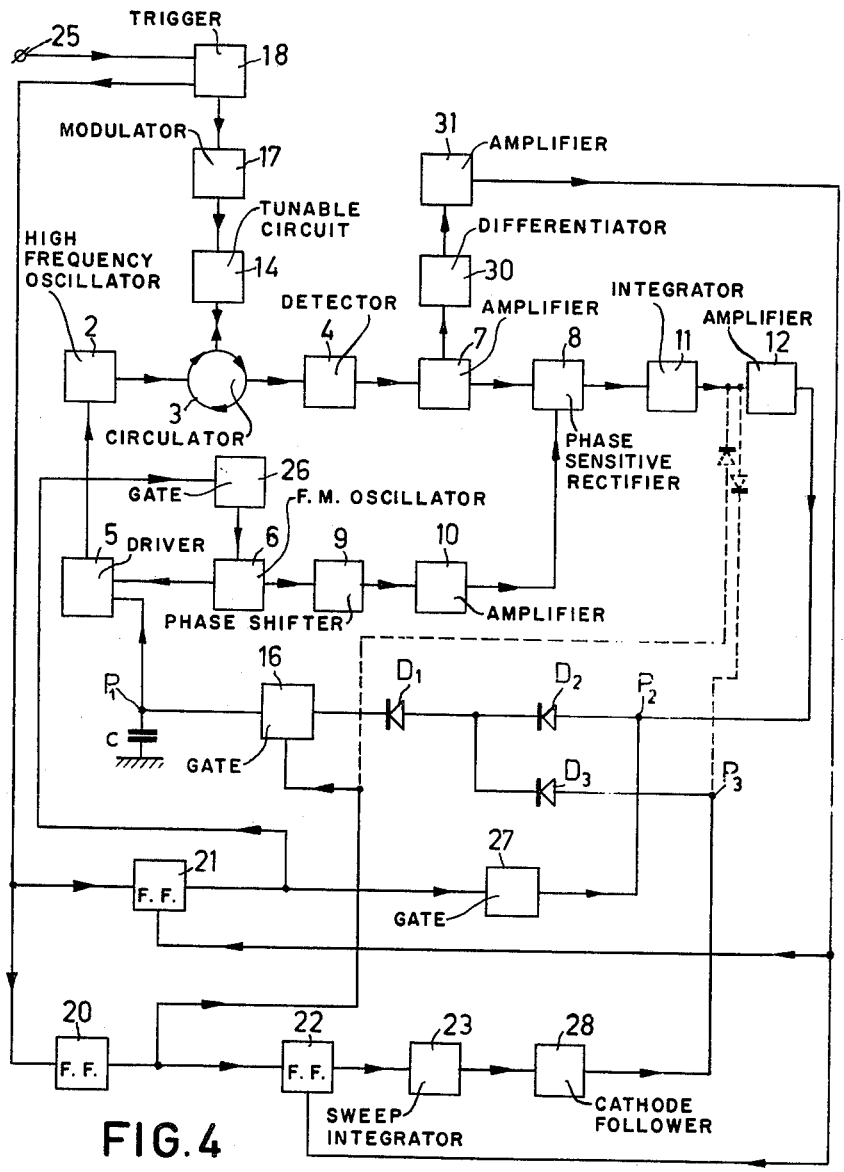
Figure 5:
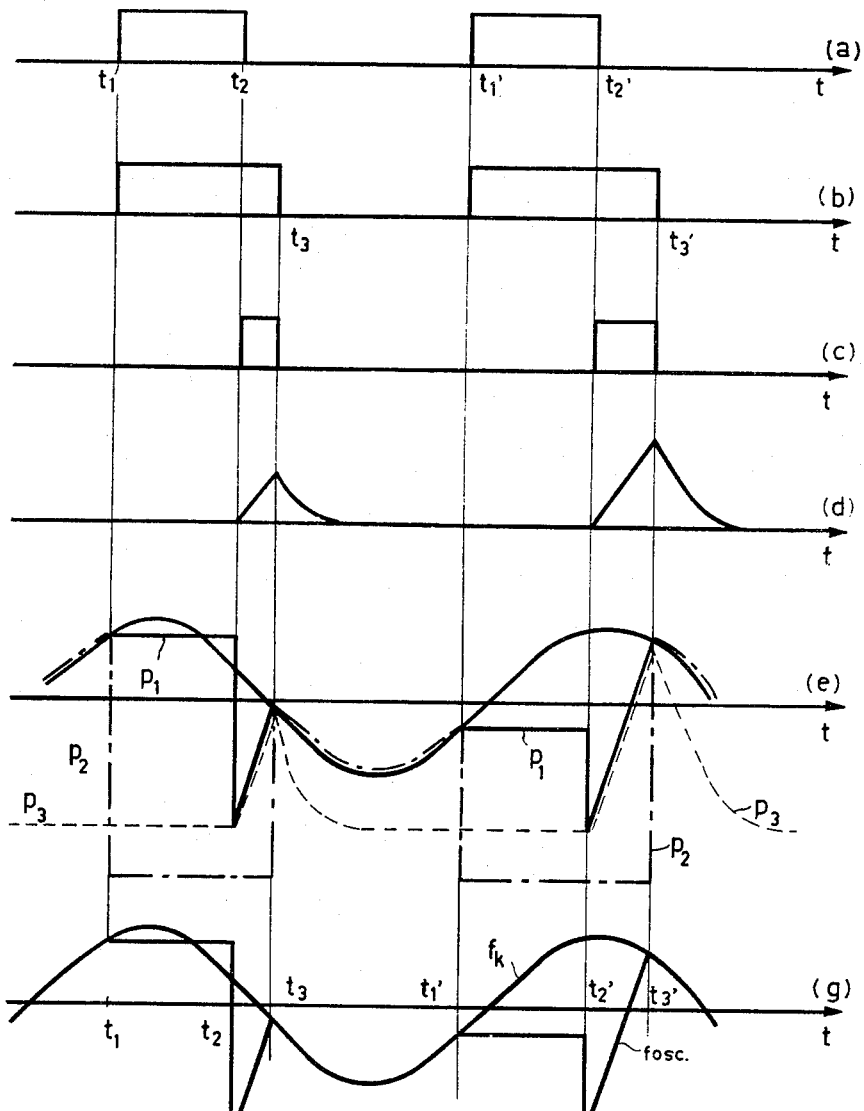

The invention is now explained more fully with reference to the accompanying drawings in which
FIG. 1 shows a block diagram of a device according to the invention,
FIG. 2 indicates the value of the oscillator energy reflected from the tunable circuit in FIG. 1 as function of the frequency,
FIG. 3 illustrates the value of the voltage derived from the phase sensitive rectifier in FIG. 1 as function of the frequency,
FIG. 4 discloses a block diagram for a radar equipment with a device according to the invention and
FIG. 5 presents time diagrams in order to explain the function of the device according to FIG. 4.

Turning to FIG. 1, the reference numeral 1 designates a tunable resonance circuit of the transmitting tube, for example a cavity resonator with a continuous tuning device, whereby the natural frequency of the resonance circuit may be varied continuously within a predetermined frequency range. A high frequency oscillator 2, having a frequency which is to coincide with the natural frequency of the passive tunable circuit 1, is connected to the first arm of a circulator 3, the next arm of which, in the energy transmission direction, is connected to the resonance circuit. The arm following the said last arm is connected to an amplitude detector or demodulator 4. The high frequency energy produced by the oscillator 2 is thus transmitted by the circulator 3 to the tunable circuit 1, while energy reflected from the said tunable circuit is transmitted to the detector 4. If it is assumed that the natural frequency of the tunable circuit is constant and equal to $f_0$ and that the frequency of the oscillator is varied, the value of the oscillator energy reflected to the detector 4 or the voltage amplitude V of the reflected energy will vary with the oscillator frequency $f$ as shown by the diagram in FIG. 2. As can be seen from this figure, a pronounced minimum appears at the point of coincidence between the oscillator frequency and the natural frequency $f_0$ of the tunable circuit.

The oscillator frequency is controlled from a driving stage 5 which is connected to a control electrode of the oscillator, the frequency of the oscillation produced thereby being dependent on the voltage on the said control electrode. According to the invention a frequency modulation oscillator 6 is connected to the driving circuit thereby causing the frequency of the oscillator 2 to vary periodically in synchronism with the voltage derived from the oscillator 6. If, for example according to FIG. 2, the frequency of the oscillator 2 is adjusted initially to the value $f_1$ and by the frequency modulation oscillator is brought to vary between the values $f_1'$ and $f_1''$ the signal reflected from the resonance circuit and received by the detector 4 will vary in amplitude between the values $V'$ and $V''$ with a modulation frequency corresponding to the frequency of the oscillator 6, for example 4 mc./s. The reflected energy is detected in the amplitude detector 4. At the output of the detector an A.C. voltage of modulation frequency will appear, having an amplitude which is represented by the distance $e$ in FIG. 2. If $f_1$ is brought to approach the resonance frequency of the circuit 1 it follows from FIG. 2 that the amplitude of the modulation A.C. voltage will decrease and will be practically equal to zero at the coincidence point. At the zero point the sign of the voltage is also changed so that the modulation A.C. voltage will have a phase difference of 180° on opposite sides of the coincidence point. The modulation A.C. voltage appearing at the output of the detector 4 is amplified in a band pass amplifier 7 having a center frequency equal to the modulation frequency. The amplified voltage is fed to the signal input of a standard phase sensitive rectifier 8 which in turn delivers a D.C. voltage having a value dependent on the value of the incoming signal and a polarity dependent upon whether the input signal has the same phase or is phase shifted 180° in relation to a reference voltage. The phase sensitive rectifier 8 reference voltage originates in the oscillator 6, and is fed to the reference input of the rectifier 8 through a phase shift device 9 and an amplifier 10. The phase shift device 9 is adjusted to produce a phase shift corresponding to the total phase shift of the modulation A.C. voltage in the loop: driving circuit 5—oscillator 2—circulator 3—tunable circuit 1—circulator 3—amplitude detector 4—amplifier 7. An A.C. voltage varying with the frequency of the oscillator 2 is derived from the rectifier 8 as shown in FIG. 3, it being still assumed that the natural frequency of the circuit 1 is constant and equal to $f_0$.

The output voltage from the rectifier 8 is fed through an integrating R.C. circuit 11, adapted to suppress A.C. voltage components and prevent self oscillations in the system. The integrated signal is then fed through a D.C. amplifier 12, for amplifying the smoothed D.C. voltage, and to the driving circuit 5 of the oscillator 2, thereby forming a closed loop control circuit wherein the output voltage from the rectifier, according to FIG. 3, passes zero and changes sign at the frequency value $f_0$, and serves as an error voltage. In the driving circuit 5 the voltage from the oscillator 6 is combined with the smoothed and amplified error voltage derived from the rectifier 8, R.C. circuit 11, and amplifier 12, so that the former voltage is superimposed upon the latter voltage thereby causing oscillator 2 to oscillate about a middle frequency determined by the amplified error voltage. ($f_1$ in FIG. 2). The feed back lead from the amplifier 12 is connected to the driving circuit 5 so that a voltage at the output of the rectifier 8 tends to regulate the frequency of the oscillator 2 in such a direction that the said voltage at the output of the rectifier (the error voltage) is regulated to zero. The error voltage, according to FIG. 3, approaches zero when the oscillator frequency approaches the natural frequency ($f_0$) of the tunable circuit. Consequently, after the ceasing of the transients the system will stabilize in a condition with the said middle frequency ($f_1$ in FIG. 2) of the oscillator 2 coinciding with the natural frequency $f_0$ of the circuit 1.

In the preceding paragraphs it has been assumed that the natural frequency of the circuit is constant. If the natural frequency is varied continuously with a relatively slow velocity the frequency of the oscillator 2 will, through the feed-back loop, be brought to vary simultaneously therewith. The magnitude of the maximum deviation is dependent upon the total amplification in the feed-back loop.

FIG. 4 shows how the described device can be used in a radar equipment. The same reference numerals as in FIG. 1 are used for corresponding components.

In FIG. 4 a feed-back circuit of the same construction as described above is shown except that the direct connection between the amplifier 12 and the driving circuit 5 shown in FIG. 1 is replaced by a circuit comprising two diodes, $D_1$ and $D_2$, and a gate 16. A capacitor C is connected across the input to the driving circuit 5. The tunable circuit is in this case formed by the output circuit of a tunable magnetron 14, having a natural frequency which is varied continuously within a predetermined frequency range. A magnetron of the type described is shown in the French Patent 1,167,523. A modulator 17 and a trigger generator 18 trigger the magnetron and a number of flip-flops 20, 21 and 22. A sweep circuit 23, in the shape of an integrating R.C. circuit, provides a frequency sweep of the local oscillator. The first flip-flop 20 is monostable and adjusted to return to its stable condition after a time interval somewhat exceeding the maximum echo time interval. The two other flip-flops 21 and 22 are of the bistable type. The function of the shown equipment will now be explained with reference to the time diagrams shown in FIG. 5, in which figure the diagrams (a), (b), (c) indicate the condition of the different flip-flops 20, 21 and 22, respectively, while the diagram (d) shows the variations in voltage with time of the output of the said integrating R.C. circuit 23. In FIG. 5(e) the curve drawn in a continuous line shows the variations in voltage of the point $P_1$ with time, the curve drawn in dash and dotted line shows the variations in voltage of the point $P_2$ and the curve drawn in dashed line shows the variations in voltage of the point $P_3$. The diagram 5(g) shows the variations in frequency with time on the one hand for the magnetron in unexcited condition $f_k$ (cold frequency) and on the other hand for the local oscillator $f_{osc}$.

It is assumed that the described feed-back loop is initially closed so that the local oscillator is slaved to the magnetron and in each moment has a frequency substantially equal to the natural frequency of the magnetron, which varies as shown by the curve $f_k$ in FIG. 5(g). At the moment $t_1$ an external trigger pulse, is received at the input terminal 25. This pulse may appear at an arbitrary moment or in a moment determined in accordance with a predetermined program. The trigger pulse acts upon the modulator 17 via a trigger generator 18 so that the modulator delivers its energy to the magnetron 14 and brings the magnetron to produce a radar pulse of required length. The radar pulse is transmitted in a known manner. Received echo pulses are fed to a receiver including a mixing stage wherein the received echo pulse is mixed with a local oscillator frequency for producing an intermediate frequency signal. The local oscillator frequency is derived from the oscillator 2 and, for the purpose of maintaining the intermediate frequency on a substantially constant value from pulse to pulse, the local oscillator frequency must be constant during the echo time interval. For example, the oscillator frequency may be equal to the frequency value appearing in the triggering moment, in which case the intermediate frequency will be approximately equal to the difference between the natural frequency of the magnetron in unexcited condition (cold frequency) and the natural frequency in excited condition (warm frequency). For this purpose a pulse is fed from the trigger generator 18 to the monostable flip-flop 20 so that the flip-flop is switched to its unstable position and thereby closes the gate 16 situated in the feed-back loop at the moment $t_1$. The capacitor C connected to the input of the driving circuit 5 will thereafter maintain the input voltage to the driving circuit and thereby the local oscillator frequency, on a constant value during the whole echo time interval until the flip-flop 20 at the moment $t_2$ returns to its stable position and opens the gate 16 (FIG. 5(a)). The pulse from the trigger generator 18 is also fed to the bistable flip-flop 21 so that this flip-flop is switched at the moment $t_1$ from its first to its second stable position (FIG. 5(b)). The output signal from the flip-flop 21 is fed through a gate 26 to the modulation wobble oscillator 6 for bringing the oscillator to a stop. The output signal from the bistable flip-flop 21 is also fed via a gate 27 to the point $P_2$ in the feed-back loop for producing a stepwise decrease of the voltage in the said point, as is evident from the curve drawn with dash and dotted line $P_2$ in FIG. 5(e). The capacitor included in the integrating R.C. circuit 23 is in this time interval charged to a rest voltage determined by the voltage at the output of the bistable flip-flop 22, which rest voltage is fed to the point $P_3$ in FIG. 4 via a cathode follower 28 and further to the feed-back circuit via a diode $D_3$. The voltage of the point $P_3$ shown by the curve drawn in dashed line $P_3$ in FIG. 5(e) is in this interval somewhat greater than the voltage of the point $P_2$.

At the end $t_2$ of the echo-time interval the monostable flip-flop 20 returns to its stable position (FIG. 5(a)) and opens the gate 16. The voltage of the point $P_1$ is now changing stepwise from the value on which it has been locked during the echo time to a value corresponding to the voltage at whichever of the points $P_2$ and $P_3$ has the higher voltage, i.e., the voltage of the point $P_3$ (see the curve $P_1$ drawn in continuous line in FIG. 5(e)). A corresponding stepwise variation in the local oscillator frequency appears at the moment $t_2$ as is shown in FIG. 5(g). When returning to its stable position the flip-flop 20 switches the bistable flip-flop 22 so that the voltage at the output of the flip-flop 22 is increasing stepwise (FIG. 5(c)). The output voltage from the flip-flop 22 is integrated in the circuit 23 and the output voltage from the circuit 23 will then increase continuously with time due to the charging of the integration capacitor as is shown in FIG. 5(d). The voltage at the output of the integrating circuit 23 is led via the cathode follower 28, point $P_3$ the diode $D_3$, the diode $D_1$, the gate 16 and the driving circuit 5 to the control electrode of the local oscillator 2 and causes a frequency sweep of the local oscillator. The local oscillator energy reflected from the output circuit of the magnetron is detected in the detector 4 and amplified in the amplifier 7 in a manner equivalent to that described in connection with FIG. 1 but with the feed-back loop still broken due to the high negative voltage at the point $P_2$. A portion of the signal passing through the amplifier 7 is fed to a differentiating circuit 30, through an amplifier unit 31 for amplifying and limiting the signal, to the bistable flip-flops 22 and 21. The frequency sweep continues until the oscillator frequency at the moment $t_3$ coincides with the natural frequency of the magnetron at this moment, a sharp minimum in the signal fed to the circuit 30 appears, resulting in a pulse which is fed to the flip-flop 22 thereby switching this flip-flop back to its initial position. The charging of the integration capacitor of the circuit 23 is interrupted and the said capacitor will begin to discharge as is shown by the curve 5(d) and the dashed curve in FIG. 5(e). The pulse derived from the differentiating circuit 30 and the amplifier 31 is also fed to the bistable flip-flop 21 so that the flip-flop 21 at the moment $t_3$ will return to its initial position and thereby disconnect the low voltage from the point $P_2$. The feed-back loop is now closed as the gate 16 has been opened already at the moment $t_2$. The bistable flip-flop 21 at this point starts the modulation oscillator 6 via the gate 26, and the local oscillator will now be controlled automatically and continuously so that its frequency in each moment substantially coincides with the natural frequency of the magnetron until new triggering occurs at the moment $t_1'$, and the process is repeated.

In order to ensure that the automatic regulation of the oscillator frequency will start after the end of a frequency sweep and before the difference between the frequencies becomes so great that the frequency coupling is lost, voltages derived from the output of the echo time flip-flop 20 and the sweep producing circuit 23, 28 may be fed to the input of the D.C. amplifier 12, as is indicated in FIG. 4 by dashed lines. These voltages are chosen such that the input voltage of the amplifier 12 at the end of the frequency sweep is pre-set on the correct values. No time is lost for charging of the capacitor included in the integrating R.C. circuit 11 and the automatic frequency regulation can start immediately at the time for coincidence between the oscillator frequency and the natural frequency of the transmitter tube.

All components in the shown and described device are of conventional construction and are not described in detail.

Many modifications of the described embodiment are possible within the scope of the invention. Thus it is not necessary that the frequency of the local oscillator during the echo time interval is maintained on a value coinciding with the frequency value in the triggering moment but the oscillator frequency may for example be regulated at the beginning of the echo time interval in order to achieve compensation for slow and rapid variations in the resulting difference frequency (the intermediate frequency). The invention is not limited to be used in radar equipments but the general principles of the invention may be applied in each field where it is required to maintain coupling with respect to frequency between a H.F. oscillator and a tunable circuit.

What is claimed is:

1. A radar transceiver device comprising a transmitting tube having periods of excitation and non-excitation and a tunable circuit for determining the carrier frequency of the transmitted radar pulses, a modulator connected to said tube for producing a transmitting pulse through said tube, means applying an excitation pulse to said modulator causing radar pulses to be transmitted having a frequency depending upon the instant of excitation, a receiver means responsive to the echo time interval of said transmitted radar pulse for measuring the distance from said transceiver device to a target, said receiver means comprising a variable frequency local oscillator, means connecting said oscillator to said transmitting tube, control means coupled to the tunable circuit of said tube and to said oscillator for providing a control signal representative of the frequency differential between said tube and said oscillator, means applying said control signal to said oscillator whereby the frequency of said oscillator varies synchronously with the varying frequency of said tube in non excited condition, storage means connected to said control means, and means for applying said excitation pulse to said storage means, said storage means holding said control signal at a value equal to the level of said control signal at the moment of excitation for a duration dependent upon the said echo time interval.

2. A radar transceiver device comprising a variably tunable magnetron having periods of excitation and non-excitation and having a first resonant frequency in the excited state, a second resonant frequency in the non excited state, and a tunable circuit for determining the carrier frequency of the transmitted radar pulses, a modulator connected to said tube for producing a transmitting pulse through said tube, means applying an excitation pulse to said modulator for causing radar pulses to be transmitted having a frequency depending upon the instant of excitation, a receiver means responsive to the echo time interval of said transmitted radar pulse for measuring the distance from said transceiver device to a target, said receiver means comprising a variable frequency local oscillator, means connecting said oscillator to said transmitting tube, control means coupled to the tunable circuit of said tube and to said oscillator for providing a control signal representative of the frequency differential between said tube and said oscillator, means applying said control signal to said oscillator whereby the frequency of said oscillator varies synchronously with the varying frequency of said tube in non excited condition, storage means connected to said control means, and means for applying said excitation pulse to said storage means, said storage means holding said control signal at a value equal to the level of said control signal at the moment of excitation for a duration dependent upon the said echo time interval.

3. A radar transceiver device comprising a transmitting tube having periods of excitation and non-excitation and a continuously variable tuned circuit for determining the carrier frequency of the transmitted radar pulses, a modulator connected to said tube for producing a transmitting pulse through said tube, means applying an excitation pulse to said modulator for causing radar pulses having a frequency depending upon the instant of excitation to be transmitted, a receiver means responsive to the echo time interval of said transmitted radar pulse for measuring of the distance from said transceiver device to a target, said receiver means comprising a variable frequency local oscillator, means connecting said oscillator to said transmitting tube, control means coupled to the tuned circuit of said tube and to said oscillator for providing a control signal representative of the frequency differential between said tube and said oscillator, means applying said control signal to said oscillator whereby the frequency of said oscillator varies synchronously with the varying frequency of said tube in non excited condition, storage means connected to said variable frequency local oscillator for storing the momentary value of said control signal, means connected to said control means for interrupting said control signal at the moment of excitation whereby said oscillator will be driven by the control signal stored in said storage means, and means for restoring the supply of control signal at the termination of said echo time interval.

4. A device as claimed in claim 3, further comprising means for frequency modulating the output energy of the said variable frequency local oscillator, means for feeding the modulated oscillator energy to the said tuned circuit of the transmitting tube, means for detecting the oscillator energy reflected from the said tuned circuit, and phase sensitive rectifier means having its reference input connected to the said frequency modulating means and its signal input connected to the said detecting means for producing a control voltage representing the difference between the center frequency of the local oscillator and the natural frequency of the tuned circuit, the said control voltage being used for controlling the local oscillator frequency so as to substantially maintain synchronism between the two frequencies.

5. A device as claimed in claim 4 wherein the said storing means comprises a capacitor connected to the means for producing the conrtol voltage and the local oscillator, means for disconnecting the said control voltage from the said capacitor in the triggering moment and blocking the output of the said frequency modulating means whereby the oscillator frequency from the triggering moment and during a time interval corresponding to the echo time interval is determined by the charge of the capacitor in the triggering moment.

6. A device as claimed in claim 5 further including means causing the local oscillator to make a frequency sweep at the end of the echo time interval for instantly restoring the condition of coincidence between the oscillator frequency and the natural frequency of the said tuned circuit.

7. A radar control system comprising a pulse transmitting means having a variable operating frequency, said transmitting means having periods of excitation and non-excitation, an oscillator, said oscillator having an oscillation frequency which varies in response to a signal applied thereto, means connecting said oscillator to said pulse transmitting means, control means connected to said pulse transmitting means and to said oscillator for deriving a control signal having a magnitude representative of the frequency differential between the operating frequency of said transmitting means and the frequency of said oscillator, means for applying the said control signal to said oscillator for varying the oscillation frequency in accordance with the magnitude of said control signal during periods of non-excitation of said transmitting means, and means connected to said control means for maintaining said control signal constant during periods of excitation of said transmitting means, at a value equal to the magnitude of said control signal at the moment of excitation.

8. A radar control system comprising a pulse transmitting tube having a continuously variable passive tunable circuit for determining the carrier frequency of the transmitted pulses, a modulator connected to said tube for producing a transmitting pulse through said tube, means applying an excitation pulse to said modulator causing radar pulses to be transmitted, said pulses having a frequency dependent upon the resonant frequency of said passive tunable circuit at the instant of excitation, a receiver means response to the echo time interval of said transmitted pulses, said receiver means comprising an oscillator, said oscillator having an oscillation frequency variable in response to the characteristics of a signal applied to said input electrode, energy transmission means connecting said oscillator to said transmitting tube for conveying energy from said oscillator to said tube, control means connected to said energy transmission means and responsive to the resultant energy reflected from said tube for deriving a control signal having a magnitude representative of the resultant differential between the oscillation frequency of said oscillator and the operating frequency of said transmitting tube as determined by said reflected energy, means for applying the said control signal to said oscillator for varying the oscillation frequency in accordance with the magnitude of said control signal during periods of non-excitation of said transmitting tube, storage means connected to said control means, said storage means maintaining said control signal constant, during periods of excitation of said transmitting tube, at a value equal to the magnitude of said control signal at the instant of excitation for a duration dependent upon the said echo time interval, means connected to said control means for interrupting said control signal at the instant of excitation, said oscillator being driven by the control signal stored in said storage means, and restoring means connected to said control means for restoring the supply of control signal from said control means at the termination of said echo time interval.

References Cited by the Examiner

UNITED STATES PATENTS 3,163,862  12/1964  Jenny _____ 343—14 X

CHESTER L. JUSTUS, *Primary Examiner.*

R. D. BENNETT, *Assistant Examiner.*